(12) United States Patent
Chen et al.

(10) Patent No.: US 9,673,566 B2
(45) Date of Patent: Jun. 6, 2017

(54) ELECTRONIC DEVICE

(71) Applicant: Acer Incorporated, New Taipei (TW)

(72) Inventors: Hung-Chi Chen, New Taipei (TW);
Jian-Siang Wang, New Taipei (TW);
Yi-Chang Yeh, New Taipei (TW);
Chi-Hung Lai, New Taipei (TW);
Wu-Chen Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/710,606

(22) Filed: May 13, 2015

(65) Prior Publication Data
US 2016/0218472 A1 Jul. 28, 2016

(30) Foreign Application Priority Data
Jan. 26, 2015 (TW) .............................. 104102530 A

(51) Int. Cl.
| H01R 13/631 | (2006.01) |
|---|---|
| H01R 13/453 | (2006.01) |
| G06F 1/16 | (2006.01) |
| G06F 3/02 | (2006.01) |

(52) U.S. Cl.
CPC ......... *H01R 13/631* (2013.01); *G06F 1/1626* (2013.01); *G06F 1/1632* (2013.01); *G06F 1/1654* (2013.01); *G06F 1/1656* (2013.01); *G06F 1/1681* (2013.01); *G06F 1/1683* (2013.01); *G06F 3/0202* (2013.01); *H01R 13/4538* (2013.01); *H01R 2201/06* (2013.01)

(58) Field of Classification Search
CPC H01R 27/00; H01R 2201/06; H01R 13/6315;
H01R 2201/26; H01R 31/065; H01R 12/724; H01R 13/03; H01R 13/112; H01R 13/41; H01R 13/6582; H01R 13/6596; H01R 13/6675; H01R 2103/00; H01R 24/38; H01R 24/62; H01R 24/68
See application file for complete search history.

(56) References Cited

U.S. PATENT DOCUMENTS

| 5,329,427 | A | * | 7/1994 | Hogdahl | G06F 1/16 |
|---|---|---|---|---|---|
| | | | | | 361/728 |
| 5,933,321 | A | * | 8/1999 | Ruch | G06F 1/1632 |
| | | | | | 361/679.42 |
| 6,283,777 | B1 | * | 9/2001 | Canova | G06F 1/1632 |
| | | | | | 361/679.3 |
| 7,447,007 | B2 | * | 11/2008 | Jeun | G06F 1/1615 |
| | | | | | 361/679.55 |

(Continued)

FOREIGN PATENT DOCUMENTS

| TW | M445324 | 1/2013 |
|---|---|---|
| TW | M475134 | 3/2014 |

*Primary Examiner* — Truc Nguyen
(74) *Attorney, Agent, or Firm* — Jianq Chyun IP Office

(57) ABSTRACT

An electronic device including a first body, a first connecting assembly, a second body, and a second connecting assembly is provided. The first body has a recess, and the first connecting assembly is disposed at the first body and hidden in the recess. The second connecting assembly is disposed on the second body in protruding manner. The second connecting assembly is fit to be assembled in the recess and electrically connected to the first connecting assembly, such that the first and the second bodies are detachably assembled to each other.

7 Claims, 4 Drawing Sheets

(56) References Cited

U.S. PATENT DOCUMENTS

| | | | |
|---|---|---|---|
| 8,158,883 B2* | 4/2012 | Soffer | H02G 3/123 |
| | | | 174/480 |
| 8,506,322 B2* | 8/2013 | Spare | H01M 2/1022 |
| | | | 439/500 |
| 2004/0115994 A1* | 6/2004 | Wulff | H01R 13/2471 |
| | | | 439/700 |
| 2012/0071013 A1* | 3/2012 | Hung | H01R 13/648 |
| | | | 439/92 |
| 2012/0142221 A1* | 6/2012 | Naskali | H01R 31/065 |
| | | | 439/627 |
| 2014/0073178 A1* | 3/2014 | Webb | G06F 1/1632 |
| | | | 439/533 |
| 2015/0017831 A1* | 1/2015 | Wang | H01R 13/6683 |
| | | | 439/488 |

* cited by examiner

ELECTRONIC DEVICE

CROSS-REFERENCE TO RELATED APPLICATION

This application claims the priority benefit of Taiwan application serial no. 104102530, filed on Jan. 26, 2015. The entirety of the above-mentioned patent application is hereby incorporated by reference herein and made a part of this specification.

BACKGROUND OF THE INVENTION

1. Field of the Invention

The invention relates to an electronic device, and relates particularly to an electronic device having a detachably assembled body and a hidden connecting assembly.

2. Description of Related Art

The biggest difference between a portable electronic device and a traditional desktop computer is that the portable electronic device emphasises compactness so that it may be easily portable for a computer user and provides the convenience for a user to perform computer operations under various type of environments. However, portable electronic devices are limited by their compact design requirements and consequently their functions and expandability cannot be compared with a desktop computer which has larger usage space.

In view of this, many of the current portable electronic devices will additionally provide a docking station, making the docking station a carrying platform of the portable electronic device and at the same time provides additional usages and functions, for example, as a power supply for the portable electronic device, a keyboard input or related human machine interface, expansions for connecting ports or speakers and the like such that a portable electronic device may achieve complete functions of a desktop computer when not in a porting state.

However, if it is desired to achieve the above mentioned functions, a structural and electrical connection needs to be established between the portable electronic device and the docking station. A majority of conventional techniques have an external connectors disposed on the docking station and on the portable electronic device respectively to directly plug the two together. But, the exposed connector is easily susceptible to wear or even damage due to the frequency of the connections.

Therefore, how to achieve the needs for the above mentioned connections and increasing the durability and service life of the related components require contemplation by those skilled in the art to be solved.

SUMMARY OF THE INVENTION

The invention provides an electronic device having a hidden connector and such that an external appearance of the body is simplified and the service life of the connector is extended.

The electronic device of the invention includes a first body, a first connecting assembly, a second body and a second connecting assembly. The first body has a recess. The first connecting assembly is disposed at the first body and hidden in the recess. The second connecting assembly is disposed on the second body in a protruding manner wherein the second connecting assembly is adapted to be assembled in the recess and electrically connected to the first connecting assembly such that the first body and the second body are detachably assembled to each other.

Based on the above, the electronic device of the invention allows the second connecting assembly to be structurally embedded in the recess and allows the first connecting assembly and the second connecting assembly to achieve an electrical connection by disposing the first connecting assembly at the first body and hidden in the recess. This benefits the first body and the second body to establish a structural and electrically connection at the same time and effectively lowers the risk generated when done separately. Namely, the body structure aids in the connection of the electrical connection device, and damages caused by repetitive use of an external connector or a situation where there are alignment difficulties may be prevented.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
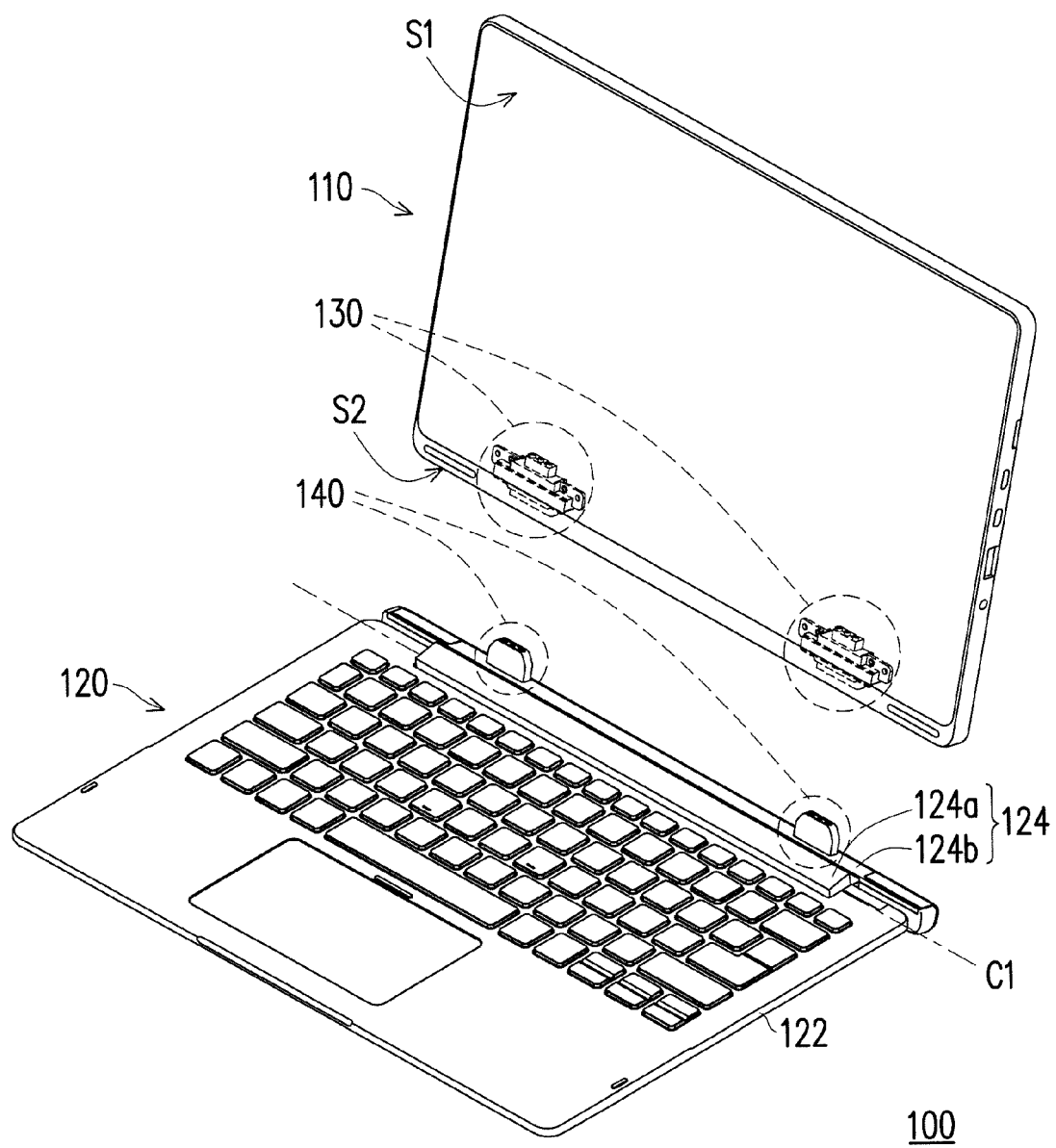
FIG. 1 is a schematic diagram illustrating an electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram illustrating an electronic device according to an embodiment of the invention. Referring to FIG. 1, in the present embodiment, an electronic device 100, for example, is an assembly of a tablet device and a docking station thereof. However, it should not be construed as a limitation to the invention, and in other embodiments not shown, the electronic device also may be a cell phone and a charging station. In other words, any related device including two detachably assembled components may be used in the invention. Below, a tablet device and a docking station will be described as an example.

Figure 2:
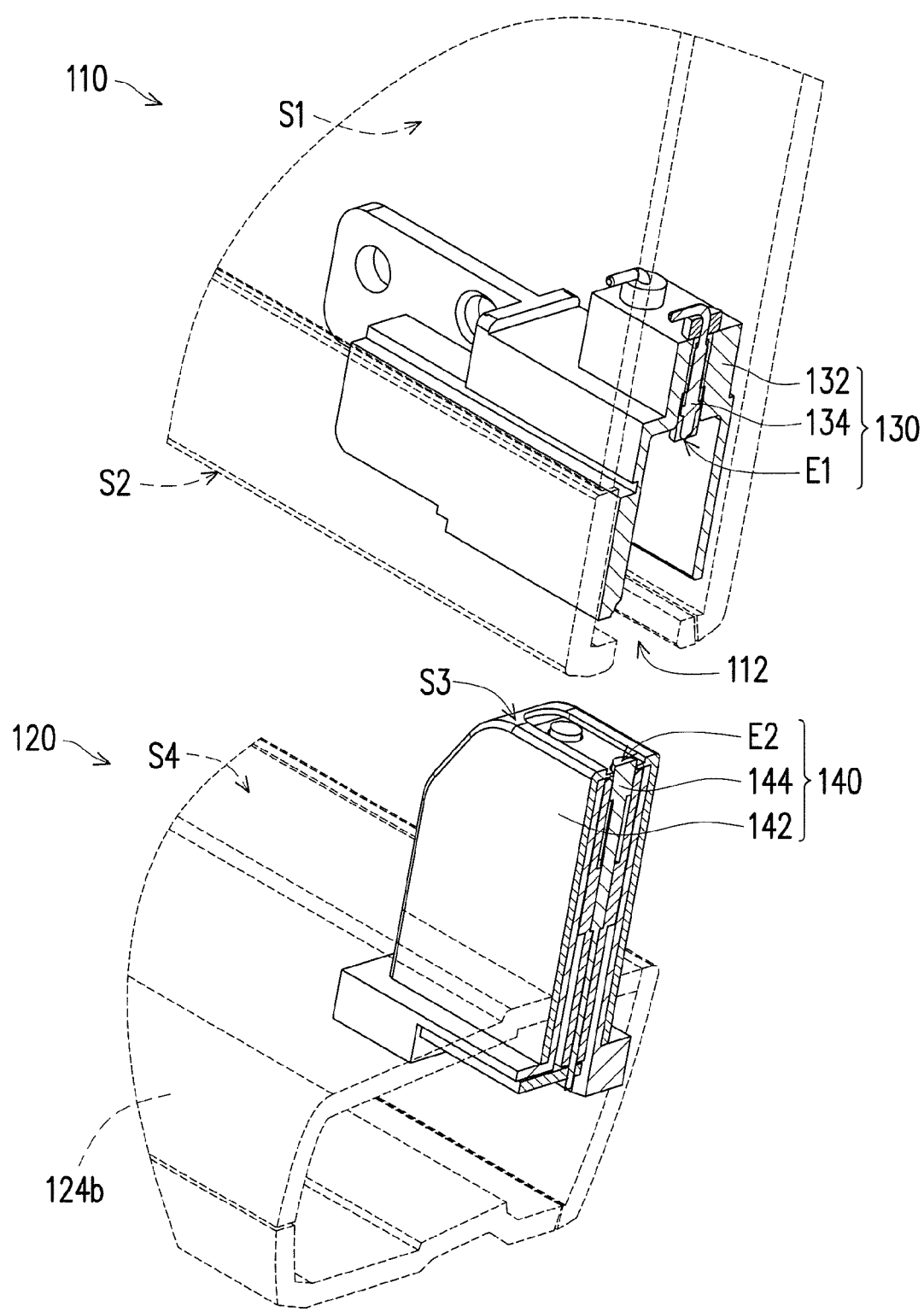
FIG. 2 is a partially enlarged sectional diagram illustrating the electronic device of FIG. 1.

FIG. 2 is a partially enlarged sectional diagram illustrating the electronic device of FIG. 1. Here, a first body 110 and a second body 120 are illustrated separately. The dotted lines illustrate the internal structures, and the related structures in the body may be clearly identified. In the present embodiment, the electronic device 100 includes the first body 110, the second body 120, a first connecting assembly 130 and a second connecting assembly 140. The first body 110, for example, is the above mentioned tablet device, the tablet device has a display surface S1 and an adjacent bottom surface S2. The first body 110 further has a pair of recesses 112 located at the bottom surface S2. Due to the related components of the present embodiment (for example the recesses 112, the first connecting assemblies 130 and the second connecting assemblies 140) are in a state having bilateral symmetry, subsequently only one side of the structure is described and shown in FIG. 2 for representation.

Referring to FIG. 1 and FIG. 2, the first connecting assembly 130 is disposed in the first body 110 and hidden in the recess 112. More specifically, the first connecting assembly 130 includes a first fastener 132 and a plurality of first terminals 134. The first fastener 132 is disposed at the inner wall of the recess 112 and the first terminals 134 are embedded at the first fastener 132 and electrically connected to the first body 110, wherein a first connecting end E1 of each of the first terminals 134 are exposed from the first fastener 132 and are located in the recess 112.

Correspondingly, the second body 120 includes a first component 122 and a second component 124, wherein the first component 122, for example, has a touch panel or a keyboard or such input device docking station as shown in the figure. The second component 124 is pivoted on one side of the first component 122 to rotate relative to the first component 122. The second connecting assembly 140 is disposed on the second component 124 in a protruding manner.

More specifically, the second component 124 has a pivoting part 124a and a carrying part 124b. The pivoting part 124a is pivoted to the first component 122 such that the second component 124 is able to rotate relative to the first component 122 about the rotation axis C1. The second connecting assembly 140 includes a second fastener 142 and a plurality of second terminals 144, wherein the second fastener 142 is disposed on the carrying part 124b of the second component 124. The second fastener 142 has a top surface S3 with a back side facing the second component 124. The second terminals 144 are disposed in the second fastener 142 and are electrically connected to the second body 120. A second connecting end E2 of each of the second terminals 144 are exposed at the top surface S3.

Accordingly, the first body 110 and the second body 120 may be assembled together by a mutual arrangement of the first connecting assembly 130 and the second connecting assembly 140. Namely in the present embodiment, the second fastener 142 of the second connecting assembly 140 is adapted to be assembled at the recess 112 of the first body 110 and the second fastener 142 may be sandwiched and fixed by the first fastener 132 after entering the recess 112 such that the bottom surface S2 of the first body 110 is abutted on a carrying surface S4 of the carrying part 124b, ultimately achieving the effect of assembling and fixing the first body 110 and the second body 120 together.

It should be noted, the first fastener which is disposed on the inner wall of the recess 112 has a conventional holding structure (not shown) such as a latch. Therefore, when the second fastener 142 enters the recess, the first fastener 132 is able to latch on to the second fastener 142. Here, the first fastener is not restricted to any specific structure, and a relevant structure which may allow the second fastener 142 to be fixed in the recess 112 may be used for the present embodiment.

More importantly, when the second fastener 142 enters the recess 112 and is fixed by the first fastener 132, the first connecting end E1 and the second connecting end E2 will also be abutted together, allowing the first terminal 134 and the second terminal 142 to establishing an electrical connection. In this way, the present embodiment allows a user to complete the process of establishing an electrical connection at the same time the electronic device 100 is assembled, by allowing the second terminal 144 and the second fastener 142, the first terminal 134 and the recess 112 of the first body 110 to be integrated as one structure respectively. In addition to effectively simplifying the assembly process of the first body 110 and the second body 120, when the electronic device 100 is assembled together by the above mentioned related structures, a user does not need to worry about the positioning of the connectors of the electronic device 100 or other structural factors affecting the state of the electrical connection. In other words, the structural characteristics (the second fastener 142 and the recess 112) of the present embodiment may help and aid in the electrical connection process between the first terminals 134 and the second terminals 144.

Furthermore, the external appearance of the first body 110 and the second body 120 are simplified through disposing the connecting terminals inside the related structures. As shown in FIG. 1, the first terminals 134 are hidden in the recess 112 of the first body 110 and the second terminals 144 are hidden in the second fastener 142. Therefore, with regards to the electronic device 100, in addition to the above mentioned assembly structure (the second fastener 142 and the recess 112), there are no abrupt contours between the bottom surface S2 of the first body 110 and the top surface (namely the carrying surface S4 of the carrying part 124b) of the second body 120. And with regards to the second body 120, the region of the carrying part 124b of the second component 124 that is between the pair of second fasteners 142 is also a smooth surface that does not have protruding or indenting contours. Therefore, the smooth surfaces of the two are mutually adapted for smooth contact.

Figure 3:
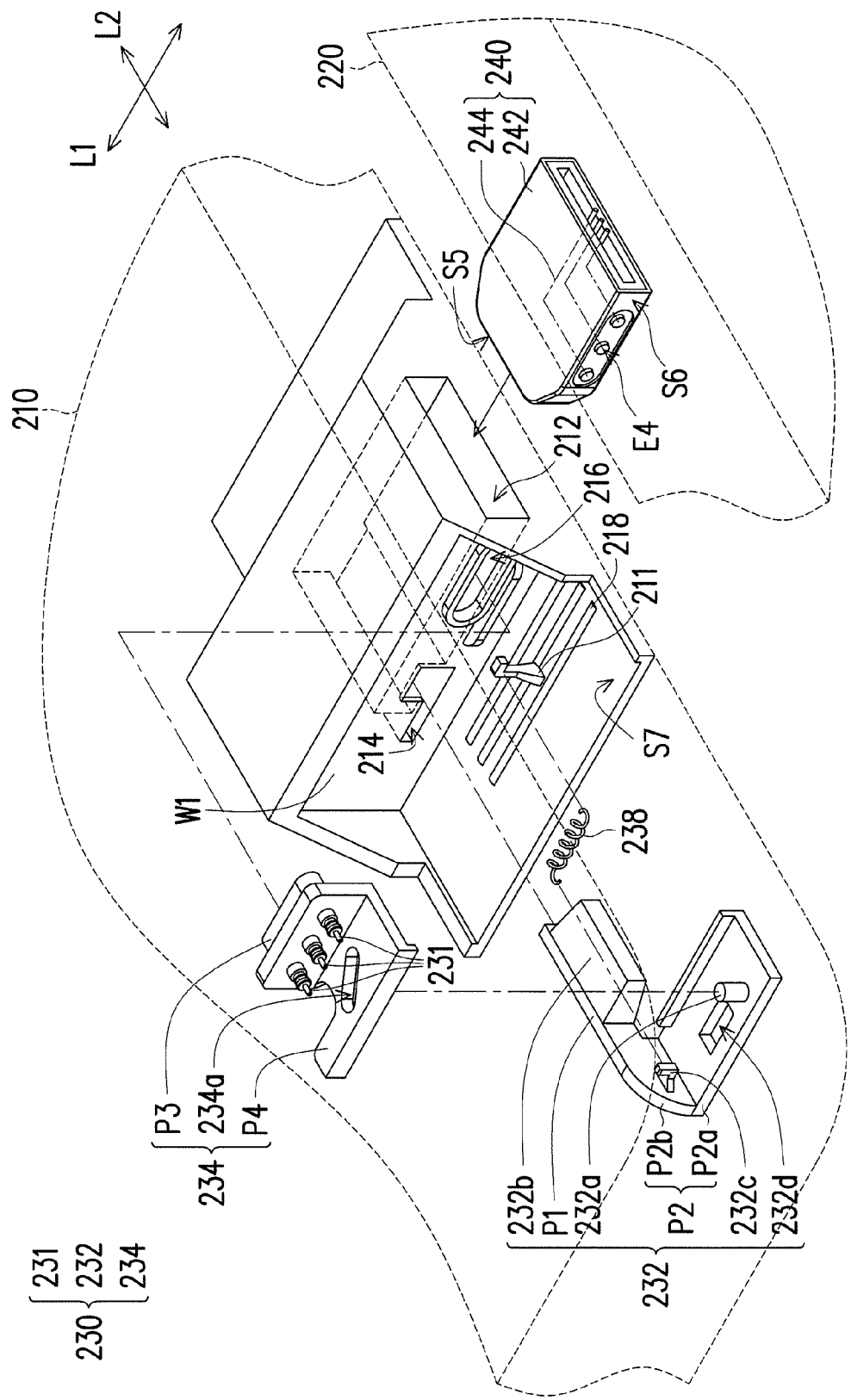
FIG. 3 is a partial exploded view of an electronic device according to another embodiment of the invention.
Figure 4:
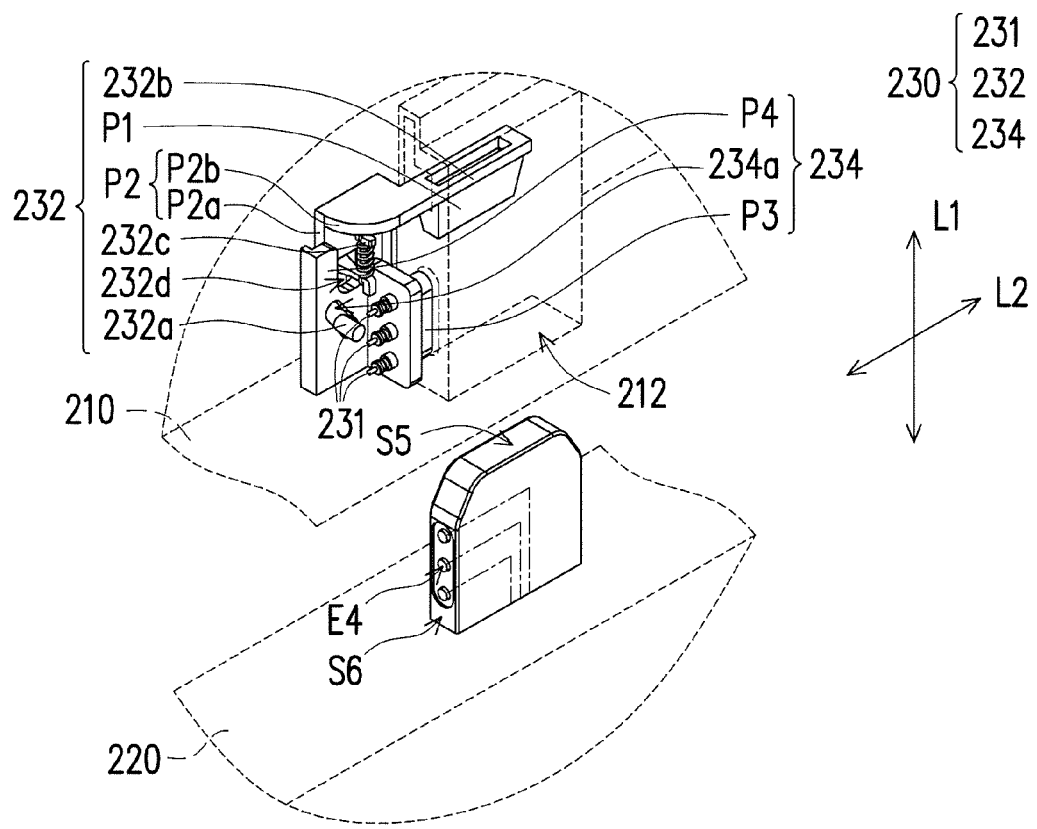
FIG. 4 and FIG. 5 are schematic diagrams respectively illustrating an assembly of the electronic device of FIG. 3.
Figure 5:
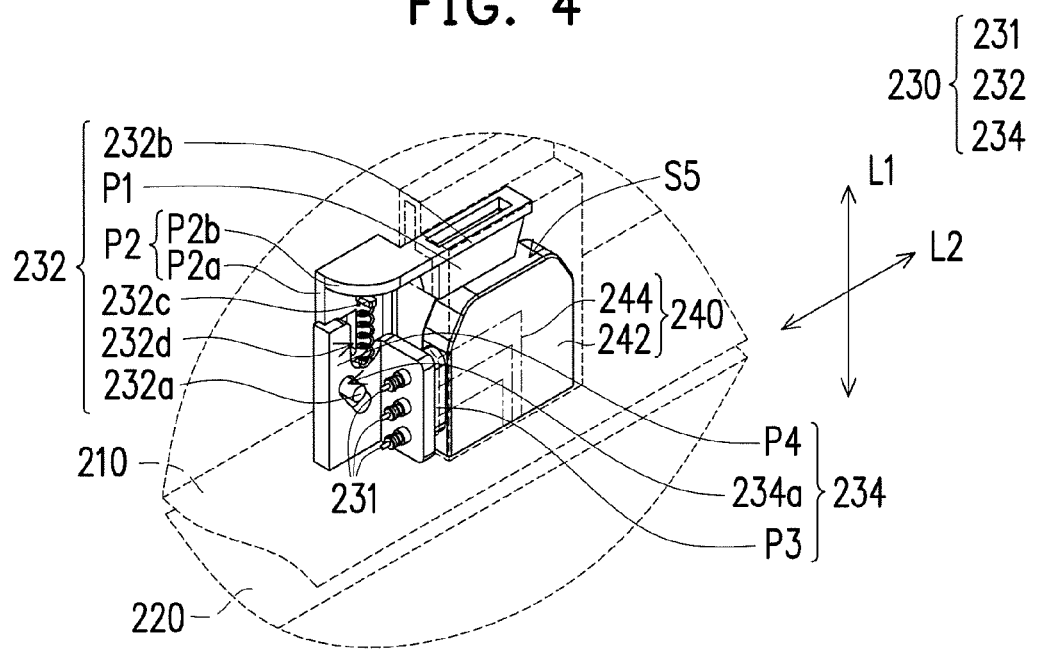

FIG. 3 is a partial exploded view of an electronic device according to another embodiment of the invention. The partial dotted lines illustrate a perspective state inside of a first body 210, wherein the first body 210 and related parts of a first connecting assembly 230 are illustrated with solid lines. FIG. 4 and FIG. 5 are schematic diagrams respectively illustrating an assembly of the electronic device of FIG. 3 describing the corresponding relationship of related components before and after assembly of the body. It should be noted, the present embodiment is similar to the previous embodiment. Therefore, reference may be made to the aforementioned embodiments for parts of the structure that are the same and will not be repeated here.

Referring to FIG. 3 through FIG. 5, in the present embodiment, the first connecting assembly 230 includes a first moving component 232, a second moving component 234 and a plurality of first terminals 231. The first moving component 232 is disposed movably in the first body 210 along a first axis L1. The second moving component 234 is disposed movably in the first body 210 along a second axis L2 and is coupled to the first moving component 232, wherein the first axis L1 is perpendicular to the second axis L2.

More specifically, the body 210 has a first opening 214 on an inner side wall W1 of the recess 212, the first moving component 232 passes through the first opening 214 and is further divided into a first part P1 and a second part P2, wherein the first part P1 is located in the recess 212 and the second part P2 is located outside the recess 212. Namely, the first opening 214 on the inner side wall W1 is made as a dividing line of the first part P1 and the second part P2. Furthermore, there is a second opening 216 on the same inner side wall W1 of the first body 210. The second moving component 234 has a third part P3 that slidably passes through the second opening 216 and a fourth part P4 that is located outside the recess 212. Namely, the third part P3 is interfered along the first axis L1 by the second opening 216 such that the second moving component 234 is restricted to only move along the second axis L2. The plurality of first connecting ends 231 of the first connecting assembly 230 are disposed at the third part P3.

In view of this, the moving axes of the first moving component 232 and the second moving component 234 are perpendicular to each other. Therefore, if it is desired for the two to have an inter-linking effect, then the connection (coupling) relationship of the two needs to be restricted. In this way, in the present embodiment, the first moving component 232 has a protruding pillar 232a located at the second part P2 and the second moving component 234 has a guiding path 234a located at the fourth part P4. The protruding pillar 232a is slidably coupled to the guiding path 234a. Here, the guiding path 234a may be regarded as being located on a virtual plane formed by the first axis L1 and the second axis L2, and an extending direction of the protruding pillar 232a is a normal direction of the virtual plane. More importantly, the extending direction of the guiding path 234a Ruins an acute angle with the first axis L1 and the second axis L2 respectively. In other words, the extending direction of the guiding path 234a is not perpendicular or parallel to the moving axis of the first moving component 232 and the moving axis of the second moving component 234 respectively. In this way, the movement of the first moving component 232 along the first axis L1 may be converted to drive the second moving component 234 to move along the second axis L2 due to the guiding path 234a.

On the other hand, the second connecting assembly 240 includes a second fastener 242 and a plurality of second terminals 244, wherein the second fastener 242 is similar to the second fastener 142 of the aforementioned embodiment. The second fastener 242 is disposed on the second body 220 and has a top surface S5 and a side surface S6. The difference is a second connecting end E4 of the second terminals 244 disposed in the second fastener 242 of the present embodiment is exposed from the side surface S6 of the second fastener 242. Correspondingly, the first part P1 of the first moving component 232 has a protruding part 232b facing toward the second fastener 242. The second fastener 242 abuts to the protruding part 232b with the top surface S5 when entering the recess 212, and drives the first moving component 232 to move along the first axis L1. In addition with the coupling relationship of the aforementioned first moving component 232 and the second moving component 234, the first moving component 232 may smoothly drive the second moving component 234 to move along the second axis L2 such that first terminal 231 in the third part P3 enters the recess 212 with its first connecting terminal (which is not shown here due to the viewing angle, reference may be made to the first connecting end E1 of the aforementioned embodiment) and mutually abuts with the second connecting end E4 located at the side surface of the second fastener 242 so as to achieve a mutual electrical connection effect between the first connecting assembly 230 and the second connecting assembly 240.

In addition, the first connecting assembly 230 further includes an elastic component 238, for example, a spring connected between the first body 210 and the first moving component 232. More specifically, the first body 210 further has a bottom surface S7 and a plurality of protruding ribs 218 disposed on the bottom surface S7 and extending along the first axis L1. The exterior of the second part P2 of the aforementioned first moving component 232 actually is similar to an L shaped plate, and has a bottom plate P2a and a side plate P2b wherein the bottom plate P2a is slidably carried on the plurality of protruding ribs 218. Namely, the friction is lowered by the structural characteristics of the protruding ribs 218 when the first moving component 232 slides along the first axis L1.

Furthermore, the first body 210 further has a first hook 211 disposed on the bottom surface S7. When the first moving component 232 is carried on the protruding ribs 218 by the bottom plate P2a, the first hook 211 will pass through an opening 232d of the bottom plate P2a. The first moving component 232 further has a second hook 232c located on the side plate P2b and two opposite ends of the elastic component 238 are hooked to the first hook 211 and the second hook 232c respectively. In this way, when the second fastener 242 of the second connecting assembly 240 enters the recess 212 and drives the first connecting assembly 232, the first moving component 232 will deform the elastic component 238; When the second fastener 242 of the second connecting assembly 240 exits the recess 212 and does not drive the first moving component 232 (namely the first moving component 232 does not receive a force from the second fastener 242), the elastic component 238 drives and restores the position of the first connecting assembly 232 by the elasticity thereof. In other words, when the first body 210 and the second body 220 are separated, the elastic component 238 allows the first connecting assembly 210 to restore its position, to facilitate the subsequent assembly process.

In summary, in the above mentioned embodiments of the invention, an electronic device includes a first body and a second body detachably assembled, and a first terminal and a second terminal disposed in the structural components of the body and acting as an electrical connection between the two bodies. Namely, the first connecting assembly is hidden in the recess of the first body and the second connecting assembly includes a second fastener protruding from the second body and the second terminal in the second fastener. Therefore, the first terminal and the second terminal abut each other to achieve an electrical connection when the second fastener enters the recess and locks with the first fastener. In other words, an electronic device of the disclosure disposes the components that are used to perform an electrical connection into the components of the connecting structure. Therefore, an electrical connection may be achieved by assembling the structure. Namely, a user does not need to worry about the problems of an electrical connection between the bodies when performing assembly of the structure. Furthermore, the external appearance of the first body and the second body is simplified by the hidden electrical connection component, enhancing the aesthetics of the electronic device.

In addition, in an embodiment, using the above mentioned movable characteristics of the hidden terminals, a protective effect may be further provided. Namely the first terminal enters the recess and connects with the second terminal when the second terminal enters along with the second fastener through the arrangement of the first moving component and the second moving component. Once the second terminal exits the recess (namely the first body and the second body are separated), the first terminal may restore again, therefore effectively preventing the possibility of the first terminal and the second terminal colliding when the body is assembled, further increasing the durability of the terminals and the service life of the electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
    a first body, having a recess;
    a first connecting assembly, disposed at the first body and hidden in the recess;
    a second body; and
    a second connecting assembly, disposed on the second body in a protruding manner, wherein the second connecting assembly is adapted to be assembled in the recess and electrically connected to the first connecting assembly such that the first body and the second body are detachably assembled to each other, the second connecting assembly has a plurality of second terminal electrically connected to the second body, and the first connecting assembly comprises:
    a first fastener, disposed at an inner wall of the recess;
    a first moving component, disposed movably in the first body along a first axis;
    a second moving component, disposed movably in the first body along a second axis and coupled to the first moving component, in which the first axis is perpendicular to the second axis; and
    a plurality of first terminals, electrically connected to the first body and disposed on the second moving component, during a process of the second connecting assembly entering the recess, the second connecting assembly drives the first moving component to move along the first axis such that the first moving component drives the second moving component along the second axis to move closer to the second connecting assembly for the first terminals being electrically connected to the second terminals.

2. The electronic device as claimed in claim 1, wherein the first moving component has a protruding pillar and the second moving component has a guiding path in which the protruding pillar is slidably coupled to the guiding path.

3. The electronic device as claimed in claim 2, wherein a side wall of the recess has a first opening, the first moving component movably disposed at and passes through the first opening, and the first moving component is separated by the first opening into a first part located in the recess and a second part located outside the recess, wherein the first part is located on a path where the second connecting assembly enters the recess and the protruding pillar is located at the second part.

4. The electronic device as claimed in claim 2, wherein a side wall of the recess has a second opening, the second moving component has a third part movable to pass through the second opening and a fourth part located outside the recess, the first terminals are disposed at the third part such that a plurality of first connecting ends of the first terminals enter or exit the recess with the third part, the guiding path is located on the fourth part.

5. The electronic device as claimed in claim 4, wherein the second opening restricts the third part such that the second moving component only moves along the second axis.

6. The electronic device as claimed in claim 4, wherein the second connecting assembly further comprises:
    a second fastener, disposed on the second body, wherein the second fastener has a top surface and a side surface and a back side of the top surface faces the second body, the second terminals are disposed in the second fastener, and a second connecting end of each of the second terminals are exposed at the side surface, when the second fastener enters the recess the side surface faces the side wall, and the first connecting ends enter the recess with the third part and electrically connect to the second connecting ends of the second terminals.

7. The electronic device as claimed in claim 1, wherein the first connecting assembly further comprises:
    an elastic component connected between the first body and the first moving component, wherein when the second connecting assembly enters the recess and drives the first moving component, the first moving component deforms the elastic component, and when the second connecting assembly exits the recess and does not drive the first moving component, the elastic component drives the first moving component to restore position by the elasticity of the elastic component.

* * * * *